United States Patent
Yokokawa et al.

(10) Patent No.: US 9,120,688 B2
(45) Date of Patent: Sep. 1, 2015

(54) SEAWATER DESALINATION PLANT SYSTEM

(75) Inventors: Katsuya Yokokawa, Tokyo (JP); Ryo Namba, Kanagawa-ken (JP); Takeshi Matsushiro, Kanagawa-ken (JP); Hideaki Yamagata, Chiba-ken (JP); Futoshi Kurokawa, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 426 days.

(21) Appl. No.: 13/606,464

(22) Filed: Sep. 7, 2012

(65) Prior Publication Data

US 2013/0066475 A1    Mar. 14, 2013

(30) Foreign Application Priority Data

Sep. 14, 2011  (JP) .................. 2011-200922

(51) Int. Cl.
| | |
|---|---|
| *G05D 9/00* | (2006.01) |
| *C02F 1/44* | (2006.01) |
| *C02F 1/00* | (2006.01) |
| *G05B 13/02* | (2006.01) |
| *C02F 103/08* | (2006.01) |

(52) U.S. Cl.
CPC ............... *C02F 1/441* (2013.01); *C02F 1/008* (2013.01); *G05B 13/026* (2013.01); *C02F 2103/08* (2013.01); *C02F 2209/001* (2013.01);
(Continued)

(58) Field of Classification Search
CPC ...... C02F 1/008; C02F 1/441; C02F 2103/08; C02F 2209/001; C02F 2209/006; C02F 2209/02; C02F 2209/40; C02F 2209/42; C02F 2303/10; C02F 2303/24; G05B 13/026; G05B 2219/32018
USPC ......................................... 700/281
See application file for complete search history.

(56) References Cited

U.S. PATENT DOCUMENTS 4,539,091 A * 9/1985 Kaneda et al. ............. 204/628
5,679,254 A * 10/1997 Chakrabarti ................ 210/642
(Continued)

FOREIGN PATENT DOCUMENTS

| JP | H11-033360 A | 2/1999 |
| JP | 2001-046842 A | 2/2001 |

(Continued)

OTHER PUBLICATIONS

Notice of Reasons for Refusal dispatched Jul. 23, 2013 in corresponding Japanese Pat. App. No. 2011-200922 in ten (10) pages.

*Primary Examiner* — Kenneth Lo
*Assistant Examiner* — Derrick Boateng
(74) *Attorney, Agent, or Firm* — Knobbe, Martens, Olson & Bear, LLP (57) ABSTRACT

According to one embodiment, a seawater desalination plant system includes a plant unit that produces fresh water from seawater. The seawater desalination plant system predicts quality of seawater for each predetermined time (for example, 1 hour) for a certain definite period (for example, 24 hours) based on a past actual measurement value of quality of seawater; creates a plurality of proposed plans of fresh water production quantity during the definite period in each of which fresh water production quantity required for the definite period is allotted to the each predetermined time; calculates, with respect to the proposed plans, electric power consumption rates for desalination using the predicted quality of seawater, the fresh water production quantity and a previously obtained recovery rate; and obtains an optimum plan of fresh water production quantity with a minimum electric power consumption rate from the proposed plans.

12 Claims, 8 Drawing Sheets

(52) U.S. Cl.
CPC ....... *C02F2209/006* (2013.01); *C02F 2209/02* (2013.01); *C02F 2209/40* (2013.01); *C02F 2209/42* (2013.01); *C02F 2303/10* (2013.01); *C02F 2303/24* (2013.01); *G05B 2219/32018* (2013.01); *Y02W 10/30* (2015.05)

(56) References Cited

U.S. PATENT DOCUMENTS 6,132,613 A * 10/2000 Hopkin et al. ........... 210/321.68
6,190,556 B1 * 2/2001 Uhlinger ........................ 210/636
2011/0278208 A1 11/2011 Namba et al.
2012/0067791 A1 3/2012 Yokokawa et al.

FOREIGN PATENT DOCUMENTS

| JP | 2006-281092 | A | 10/2006 |
| JP | 2007-245084 | A | 9/2007 |
| JP | 2009-000580 | A | 1/2009 |
| JP | 4341865 | B2 | 10/2009 |

* cited by examiner

| Time | 22 | 23 | 0 | 1 | 2 | 3 | 4 | 5 | ... | 21 |
|---|---|---|---|---|---|---|---|---|---|---|
| Water production quantity 1 | 0 | 0 | 0 | 0 | 0 | 0 | 0 | 0 | ... | 0 |
| Water production quantity 2 | 0 | 0 | 1 | 0 | 1 | 0 | 0 | 0 | ... | 0 |
| Water production quantity 3 | 0 | 0 | 0 | 1 | 0 | 1 | 0 | 0 | ... | 0 |
| Water production quantity 6 | 0 | 1 | 0 | 0 | 0 | 0 | 1 | 0 | ... | 0 |
| Water production quantity 7 | 0 | 0 | 0 | 0 | 0 | 0 | 0 | 1 | ... | 1 |
| Water production quantity 8 | 1 | 0 | 0 | 0 | 0 | 0 | 0 | 0 | ... | 0 |

Quantization method for plan of water production quantity

SEAWATER DESALINATION PLANT SYSTEM

CROSS-REFERENCE TO RELATED APPLICATION

This application is based upon and claims the benefit of priority from the prior Japanese Patent Application No. 2011-200922, (Filing date: Sep. 14, 2011), the entire contents of which are incorporated herein by reference.

FIELD

Embodiments of the present invention relate to a seawater desalination plant system which produces fresh water from seawater and supplies the produced fresh water to customers through a distribution reservoir.

BACKGROUND

Recently, as one of drought managements, seawater desalination plants to produce fresh water from seawater have been used. The seawater desalination plant supplies seawater to a reverse osmosis membrane, produces fresh water by filtering the seawater by the reverse osmosis membrane, and supplies the produced fresh water to customers through a distribution reservoir. Seawater desalination plants are known which control the pressure, flow rate and recovery rate (transmission rate) of seawater by pumps and valves. Japanese Patent No. 4341865 discloses a seawater desalination plant which controls the pressure of seawater applied to a reverse osmosis membrane by valves to thereby stabilize the quality of the filtrate water.

In general seawater desalination plants, operations thereof were performed so as to obtain a definite quantity of fresh water from a definite quantity of seawater as determined at the plant design stage. However, since the quality of seawater that is raw water changes from hour to hour, an electric power consumption rate required for obtaining fresh water is not constant. The filtration characteristic by a reverse osmosis membrane changes depending on the quality of seawater, for example. For this reason, if the seawater desalination plant is controlled so as to maintain the filtration characteristic to be constant, the electric power consumption rate of the electric power required for filtration also changes.

In a case where the temperature of seawater is high, since the viscosity coefficient of water is low, the transmission characteristic of a reverse osmosis membrane is good. In this case, since seawater passes through the reverse osmosis membrane at a relatively low pressure, the electric power required for pressurizing and supplying seawater is relatively small, and the required electric power consumption rate is small. On the other hand, in a case where the temperature of seawater is low, the required electric power consumption rate is large for the reason opposite to the above-described reason. In addition, in a case where the seawater salinity is high, the osmotic pressure difference between the seawater and the fresh water which is generated at the reverse osmosis membrane face is large, and the required electric power consumption rate is large.

For this reason, if the seawater desalination plant is operated so as to maintain definite fresh water production quantity, waste is incurred in the electric energy (electric power consumption rate) per day to obtain the target quantity of fresh water.

The problem to be solved by the present invention is to provide a seawater desalination plant system which is provided with a function to create a fresh water production quantity plan during a definite period so as to produce fresh water of production quantity required for the definite period with a minimum cost (electric power consumption rate), or a function to support the creation of the fresh water production quantity plan.

DETAILED DESCRIPTION

A seawater desalination plant system according to embodiments has a plant unit to produce fresh water from seawater and supplies the produced fresh water to customers through a distribution reservoir. The seawater desalination plant system includes: a seawater quality prediction means which predicts quality of seawater for each predetermined time during a certain definite period based on a past actual measurement value of quality of seawater; an optimum plan calculation means which creates a plurality of proposed plans of fresh water production quantity during the definite period in which fresh water production quantity required for the definite period is allotted to the each predetermined time, with respect to each of these plurality of proposed plans of fresh water production quantity, calculates an electric power consumption rate for producing fresh water for the each predetermined time, using the seawater quality predicted for the each predetermined time, the fresh water production quantity allotted to the each predetermined time, and a previously obtained recovery rate, and obtains an optimum fresh water production quantity plan from the plurality of proposed plans of fresh water production quantity based on the calculated electric power consumption rate; and a display means which displays the content of the optimum fresh water production quantity plan obtained by the optimum plan calculation means.

Hereinafter, seawater desalination plant systems according to embodiments will be described in detail with reference to the drawings.

First Embodiment

Figure 1:
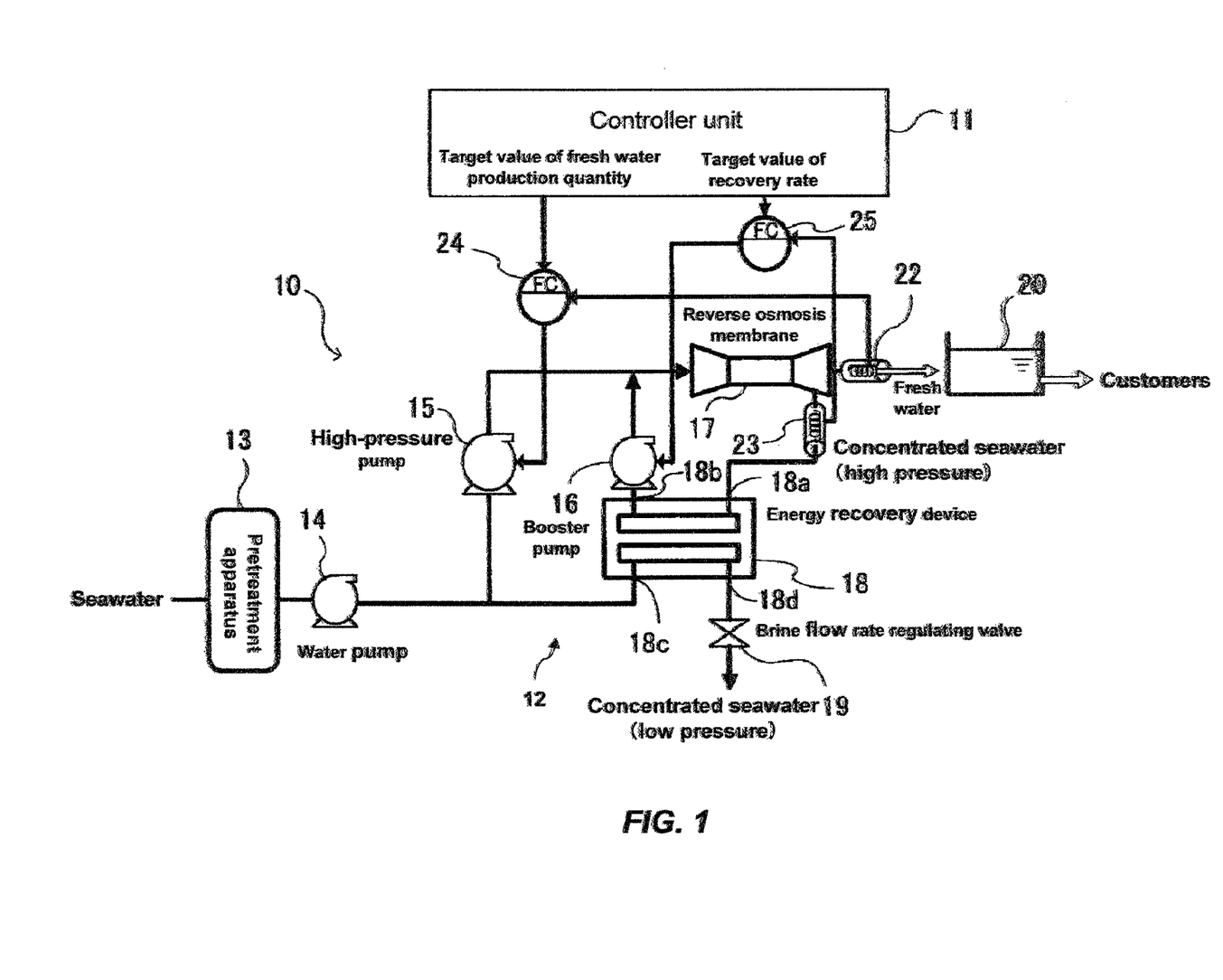
FIG. 1 shows an outline of the whole configuration of a seawater desalination plant system according to an embodiment.

A seawater desalination plant system, according to this embodiment, has a plant unit 10, a controller unit 11 of the plant unit 10 and a distribution reservoir 20, as shown in FIG. 1.

The plant unit 10 takes seawater, supplies the taken seawater to a reverse osmosis membrane, produces filtrate water filtered by this reverse osmosis membrane as fresh water, and supplies the produced fresh water to customers through the distribution reservoir 20. The controller unit 11 derives a desalination plan during a definite period (24 hours, for example) to minimize an electric power consumption ratio that is an electric energy per unit fresh water production quantity, and controls the plant unit 10 based on the derived desalination plan.

In FIG. 1, the plant unit 10 in the present embodiment has a pretreatment apparatus 13, a water pump 14, a high-pressure pump 15, a booster pump 16, a reverse osmosis membrane 17, an energy recovery device 18, a brine flow rate regulating valve 19. The fresh water produced in the plant unit 10 is supplied to the distribution reservoir 20, and is further supplied to customers from the distribution reservoir 20. In addition, the plant unit 10 is further provided with a fresh water flow meter 22, a concentrated seawater flow meter 23, a controller 24 for the high-pressure pump 15 and a controller 25 for the booster pump 16. Furthermore, the high-pressure pump 15, the booster pump 16, the reverse osmosis membrane 17, the energy recovery device 18 and the brine flow rate regulating valve 19 compose fresh water production facilities 12.

The pretreatment apparatus 13 performs pretreatment such as sand filtration for the taken seawater.

The water pump 14 sucks the seawater from the pretreatment apparatus 13, and sends the seawater to the high-pressure pump 15 and the energy recovery device 18.

The high-pressure pump 15 raises the pressure of the seawater which is sent from the water pump 14 to a high pressure state (about 6 MPa, for example). The seawater whose pressure has been raised by the high-pressure pump 15 is supplied to the reverse osmosis membrane 17. In addition, the high-pressure pump 15 whose rotation speed is variable can control the flow rate of the seawater supplied to the reverse osmosis membrane 17.

The reverse osmosis membrane 17 filters the seawater to remove the salt content contained in the seawater, and thereby produces fresh water. The produced fresh water is sent to the distribution reservoir 20, and is further supplied to customers. On the other hand, the salt content separated from the fresh water by the reverse osmosis membrane 17 is discharged along with the water which has not been desalinated as concentrated seawater. The concentrated seawater discharged from the reverse osmosis membrane 17 is supplied to the energy recovery device 18.

The distribution reservoir 20 functions as a buffer to temporarily store the fresh water produced by the plant unit 10.

The energy recovery device 18 recovers the pressure (power) which the concentrated seawater has, and raises the pressure of the seawater. Since the concentrated seawater is in a high-pressure state (about 6 MPa), the energy recovery device 18 is installed from the stand point of energy recovery.

In the present embodiment, a volumetric energy recovery device, for example, is used as the energy recovery device 18. The energy recovery device 18 is provided with a high-pressure side inlet port 18a, a high-pressure side outlet port 18b, a low-pressure side inlet port 18c, and a low-pressure side outlet port 18d. The concentrated seawater discharged form the reverse osmosis membrane 17 is supplied to the high-pressure side inlet port 18a. After the pressure energy of the concentrated seawater is recovered, it is discharged from the low-pressure side outlet port 18d. The seawater is supplied to the low-pressure side inlet port 18c from the water pump 14. The pressure of this seawater is raised as a result that the pressure (power) of the concentrated seawater has been utilized, and the seawater is discharged form the high-pressure side outlet port 18b. The seawater discharged from the high-pressure side outlet port 18b is supplied to the booster pump 16.

The booster pump 16 further raises the pressure of the seawater discharged from the high-pressure side outlet port 18b of the energy recovery device 18 by about 0.2 MPa. That is, the booster pump 16 raises the pressure of the seawater nearly equal to the pressure of the seawater discharged from the high-pressure pump 16. The seawater discharged from the booster pump 16 merges with the seawater discharged from the high-pressure pump 15, and the merged seawater is sent to the reverse osmosis membrane 17. In addition, the booster pump 19 whose rotation speed is variable controls the flow rate thereof to thereby control the flow rate of the concentrated seawater.

The brine flow rate regulating valve 19 regulates the flow rate of the concentrated seawater.

The controller 24 controls the high-pressure pump 15. The controller 24 is given a target value of fresh water production quantity from the controller unit 11, and further receives a fresh water production quantity value which has been measured by the fresh water flow meter 22. In addition, here, the fresh water production quantity means the flow rate of the fresh water which has passed through the reverse osmosis membrane 17. The controller 24 controls the high-pressure pump 15 so that the fresh water production quantity becomes equal to the target value of the fresh water production quantity.

The controller 25 controls the booster pump 16. The controller 25 is given a target value of a recovery rate from the controller unit 11, and further receives a concentrated seawater quantity value which has been measured by the concentrated seawater flow meter 23. The controller 25 controls the booster pump 16 so that a recovery rate becomes equal to a target value of the recovery rate. In addition, the recovery rate is defined by the following expression (1).

$$\text{Recovery rate} = \text{quantity of fresh water}/(\text{quantity of concentrated seawater} + \text{quantity of fresh water}) \quad (1)$$

That is, the controller 25 controls the booster pump 16 so that the recovery rate that is a ratio of the quantity of the fresh water to be obtained to the quantity of the supplied seawater becomes equal to the target value.

Next, the detailed configuration of the controller unit 11 will be described using FIG. 2. The controller unit 11 is composed of a computer, and has data reception means 31, seawater quality prediction means 32, demand prediction means 33, optimum plan calculation means 34, optimum recovery rate calculation means 35, display means 36 and data output means 37. The controller unit 11 has the seawater quality prediction means 32, the demand prediction means 33, the optimum plan calculation means 34, and the optimum recovery rate calculation means 35 as its functions. In addition to these, the controller unit 11 has data memory means 39 and a constrained condition holding unit 40 outside. The data memory means 39 stores various data including plant data, and the constrained condition holding unit 40 holds a constrained condition described later.

The data reception means 31 has operation devices such as a keyboard, a mouse, and a touch panel, and receives various data via these devices. Data to be received includes the quality of seawater (seawater temperature, salinity, and so on), weather information of the day such as weather report, and a day of the week. The weather information of the day and the day of the week are used for predicting the quantity demanded of fresh water. The received data is outputted to the seawater quality prediction means 32 and the demand prediction means 33.

The data memory means 39 stores the values such as the seawater temperature and the seawater salinity which were actually measured by the plant unit 10 on a past day, the quantity demanded which have been supplied to customers from the distribution reservoir 20, and the electric energy, along with the date and time (once every hour, for example). That is, the data memory means 39 stores time series data that is process data, such as the time and date, the seawater temperature, the seawater salinity, the quantity demanded, and the electric energy. The data memory means 39 holds the past demand record data of one day, for example, by a day of the week, such as by a holiday, a weekday, and a day after a holiday. The demand record data of one day includes the hourly demand record data.

Various data of the day which the data reception means 31 has received, and the past actual measurement data stored in the data memory means 39 are inputted to the demand prediction means 13. The demand prediction means 33, using these data, predicts quantity demanded of fresh water for each predetermined time (for every hour, for example) during a definite period (during the day, for example). And, the demand prediction means 33 determines production quantity of fresh water required for a day based on the predicted quantities demanded.

Here, an example of a prediction method by the demand prediction means 33 will be described. The demand prediction means 33 predicts, based on the weather information of the day and the day of the week, the quantity demanded for each predetermined time (determined as an hour, for example, the same below) during a definite period (determined as a day, for example, the same below) as described above. Now, when a day of the week of the prediction day is inputted from the data reception means 31 to the demand prediction means 33, the demand prediction means 33 obtains an average value pattern of the day of the week W $$\bar{y}^w(i)(i=1\sim24)$$

from the past demand record stored in the data memory means 39. In addition, since the demand record till the previous day is obtained, in order to predict the demand on a "k" day an autoregression model as in the following expression (2) is used.

$$\Delta\hat{y}^w(k)=a_1\times(y^w(k-1)-\bar{y}^w)+a_2\times(y^w(k-2)-\bar{y}^w)+\ldots \quad (2)$$

Here,
$\Delta\hat{y}^w(k)$: deviation of demand prediction value of the day [m3/h]
$a_1, a_2$: parameters $$\bar{y}^w = \sum_{i=1}^{24} \bar{y}^w(i):$$

average actual performance value till (k−1) day and furthermore, the demand prediction value $\hat{y}^w(k)$ is expressed by the following expression (3).

$$\hat{y}^w(k)=\Delta\hat{y}^w(k)+y^w(k-1) \quad (3)$$

In addition, a1, a2 . . . are autoregressive parameters, and can be previously given, and also an iterative least squares estimation (Kalman filter) can be applied.

Since the prediction value of the day $\hat{y}^w(k)$ [m3/h] and the pattern $\bar{y}^w(i)$, (i=1~24) of the day w of a week are obtained, when the prediction values of each time of day are integrated, the prediction values per hour of the day for 24 hours are obtained as in the following expression (4).

$$\hat{y}^w(k,i)(i=1\sim24)[m3/h] \quad (4)$$

In addition, a demand prediction method is not limited to the above-described method using an autoregression model, but a neural network or a GMDH (Group Method of Data Handling) may be used.

The seawater quality prediction means 32, using the weather information of the day which the data reception means 31 has received and the past actual measurement data of the seawater temperature and the salinity which are stored in the data memory means 39, predicts the change in water quality for each predetermined time (an hour, for example) during a definite period (a day, for example). As a method of predicting seawater quality, a method using an autoregression model based on the weather information and the past performance, a neural network, and a GMDH may be used in the same manner as the above-described demand prediction method. In addition, in a case where the past performance is not present at the time of installing a system, for example, definite values may be used in place of the output of the seawater quality prediction means 32.

The optimum plan calculation means 34 derives an optimum fresh water production quantity plan during a definite period, based on the quantity demanded of fresh water, the respective prediction values of seawater temperature and seawater salinity, the constrained condition described later, and the recovery ratio during the definite period. That is, the optimum plan calculation means 34 creates a plurality of proposed plans of fresh water production quantity of a day in each of which the production quantity of fresh water required for a day is allotted to each hour. The optimum plan calculation means 34, with respect to each of the proposed plans of fresh water production quantity, calculates an electric power consumption rate for producing fresh water, using the seawater quality predicted for each hour, the production quantity of fresh water allotted to each hour, and the previously obtained recovery rate. Then, the optimum plan calculation means 33 obtains an optimum fresh water production quantity plan from a plurality of the proposed plans of fresh water production quantity based on the calculated electric power consumption rates. This method will be described later.

Here, the fresh water production quantity required for a day is fresh water production quantity of a day which is required for the day determined by the demand prediction means 33 from the past quantity demanded data and so on, based on the fresh water production quantity of a day that is a reference determined at the planning stage of the seawater desalination plant. And the optimum plan calculation means 34 allots the fresh water production quantity for a day to each hour to thereby obtain the production quantity of fresh water for each hour. In addition, the optimum plan calculation means 34 obtains an electric power consumption rate for each hour required for obtaining the fresh water production quantity for each hour. The proposed plan of fresh water production quantity in which the value obtained by summing the electric power consumption rates for each hour of a day (24 hours) is least is determined as the optimum fresh water production quantity plan.

The optimum recovery rate calculation means 35 has a table in which optimum recovery rates are described for fresh water production quantities, respectively. The recovery rate is affected by the seawater temperature, the seawater salinity and the fresh water production quantity. The optimum recovery rate is previously obtained to minimize the electric power consumption ratio depending on the fresh water production quantity. The optimum recovery rate calculation means 35 determines an optimum recovery rate for each hour corresponding to the fresh water production quantity for each hour determined by the optimum plan calculation means 34.

The constrained condition holding unit 40 holds a constrained condition. The constrained condition includes a capacity of the distribution reservoir 20, operation upper and lower limits of the distribution reservoir 20, the kind of the reverse osmosis membrane 17, and the kind of the energy recovery device 18 and so on. In addition, the equipment configuration data of the plant unit 10 such as the capacity of the reservoir, and the operation upper and lower limits are invariable set values. These constrained conditions are supplied from the constrained condition holding unit 40 to the optimum plan calculation means 34.

The display means 36 displays the fresh water production quantity plan and the reduction effect of the electric power consumption rate and so on on the screen, based on the fresh water production quantity plan obtained by the optimum plan calculation means 34.

The data output means 37 outputs a target value of the fresh water production quantity for each hour and a target value of the recovery rate for each hour which are based on the optimum fresh water production quantity plan obtained by the optimum plan calculation means 34, to the plant unit 10 shown in FIG. 1 as control target values.

Here, the above-described electric power consumption rate is obtained by the following expression (5).

Electric power consumption rate=$f$(seawater temperature, seawater salinity, fresh water production quantity, and recovery rate)     (5)

In the above-described expression, it is difficult to formulate the function f. For this reason, simulation is performed by combining respective models of the reverse osmosis membrane, the energy recovery device, the pumps, and the valves, and after the behavior of the pressure and flow rate of the seawater in the whole plant is calculated, the seawater temperature, the seawater salinity, the fresh water production quantity, and the recovery rate are converted into an electric energy.

The optimum plan calculation means 34 calculates a fresh water production quantity plan to minimize the electric power consumption rate, based on the various parameters such as the demand prediction value, the seawater quality prediction value, the capacity of the distribution reservoir, the operation upper and lower limits of the distribution reservoir. For this purpose, an electric power consumption rate is formulated as in the following, for example.
(1) Object Function:
an electric power consumption rate for day=(an electric energy of a day of respective pumps/fresh
water production quantity of a day)→minimize
(2) Constrained Conditions:
Constrained conditions are such as,
That a water level of the distribution reservoir satisfies the upper and lower limits of the water level.
That the fresh water production quantity of a day is within a certain definite range from the fresh water production quantity of a day which has been made the above-described reference.

Hereinafter, a method of obtaining an optimum fresh water production quantity plan by the optimum plan calculation means 34 will be described in detail.

Figure 3:
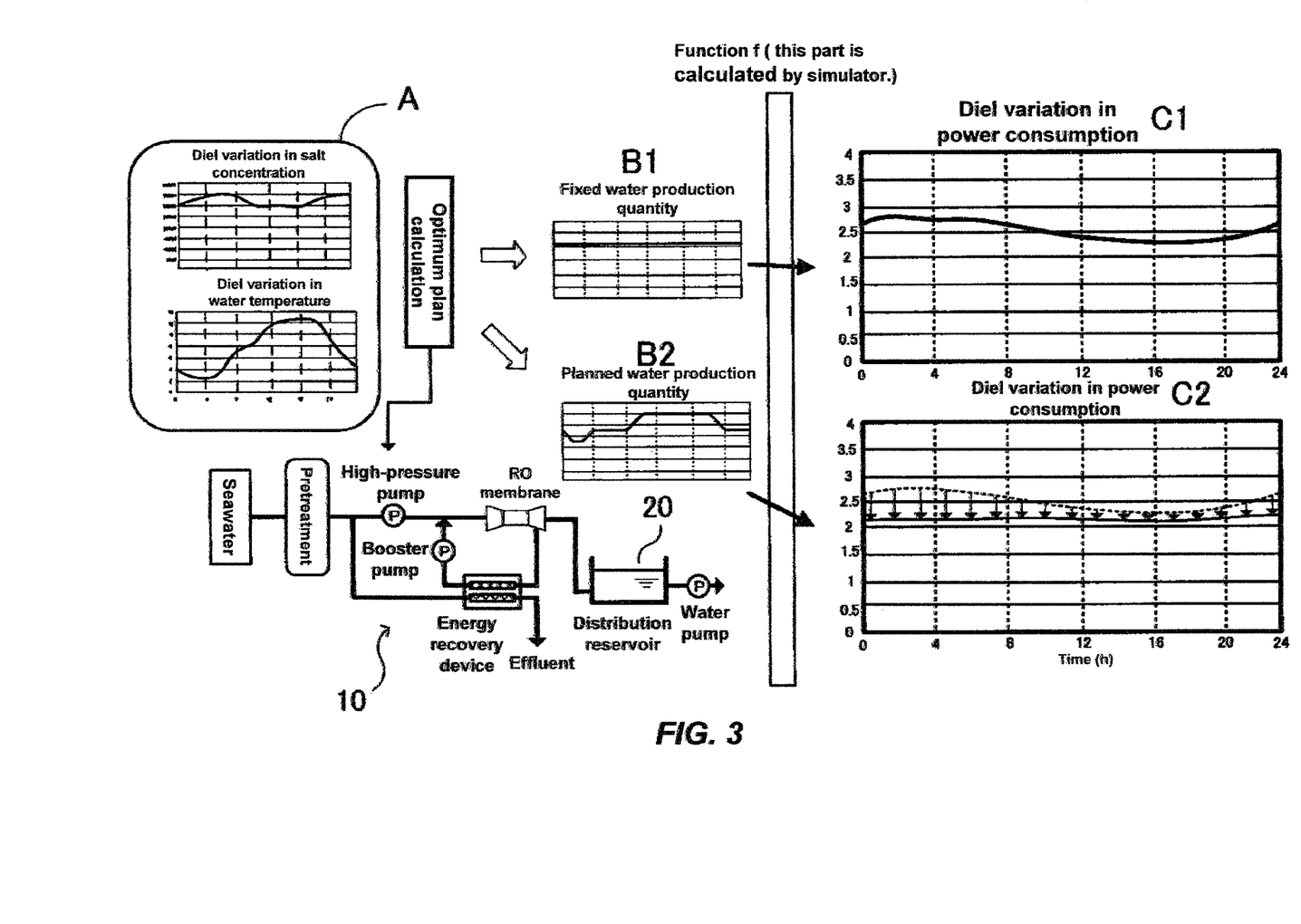
FIG. 3 describes the difference between the control of the seawater desalination plant system according to the embodiment and that of a conventional system.

Here, the optimum fresh water production quantity plan will be described with reference to FIG. 3 in comparison with a conventional method. The quality of seawater (the salinity, the seawater temperature and so on) changes for each time of day as shown by A in FIG. 3. A conventional fresh water production quantity plan produces a definite quantity of fresh water for each time of day as shown by B1. For this reason, the conventional method constantly produces a definite quantity of fresh water using the seawater with different water quality for each time of day. As a result, the power consumption required for this fresh water production changes as shown by C1 for each time of day.

On the other hand, in this embodiment, the planned fresh water quantity for each time of day is changed as shown by B2 corresponding to the change in the water quality of seawater in a day. The planned fresh water quantity for each time of day is planned so that the sum value of the planned fresh water quantities for each time of day satisfies the freshwater production quantity of a day. And, the planned fresh water production quantity for each time of day is a planned value to minimize the electric power consumption rate per day which is shown by the expression (5). As a result, the diel variation in the power consumption is small as shown by C2 compared with the conventional case (C1), and the power consumption itself also decreases.

Figure 4:
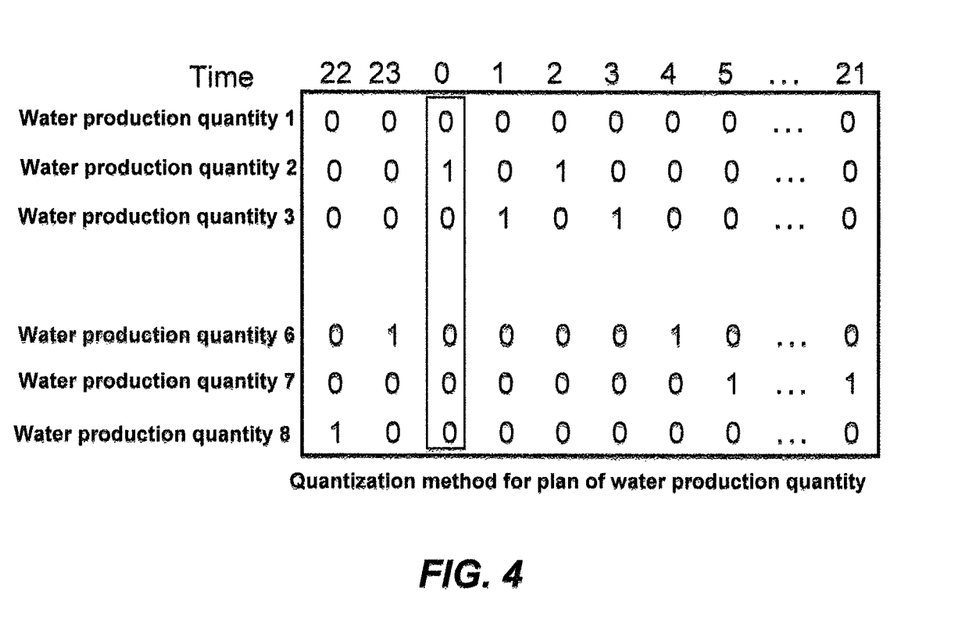
FIG. 4 describes an example of a proposed plan of fresh water production quantity in the seawater desalination plant system according to the embodiment.

Hereinafter, a specific method to obtain an optimum fresh water production quantity plan will be described. It is assumed that the plant unit 10 can control the fresh water production quantity by eight stages as shown in FIG. 4, for example. In a case where a proposed plan in which the fresh water production quantity required for a day is allotted to each hour is assumed, when fresh water production quantity at a certain time instant k is defined as Q(k), there are eight ways of Q(k). When a plan of 24 hours (a day) is to be made, the combination of the fresh water production quantities (a proposed plan of the production quantity) becomes $8^{24}$ ways (22 digits).

In the proposed plan shown in FIG. 4, for example, the production quantities for each hour at each time instant from 0 to 23 are shown by [2, 3, 2, 3, 6, 7, ... 7, 8, 6]. $8^{24}$ ways of proposed plans like this are thought of.

However, an optimum fresh water production quantity plan can not actually be solved using an all search method to evaluate all of the vast combinations like these, even with present computers. For this reason, the embodiment uses a GA (Genetic Algorithm) as an example of a solution method of this optimization problem.

In this case, a gene x(i) of each individual is defined as [Q(0), Q(1), ... Q(23)] as described above. That is, the gene of the individual is a proposed plan of fresh water production quantity during a definite period (a day), and the fresh water production quantity required for the definite period is allotted in a random manner to each predetermined time (a hour). The optimum plan calculation means 34 generates a plurality of individuals, and performs evaluation processing to evaluate each individual based on the electric power consumption rate determined by the above-described expression (5). And, the optimum plan calculation means 34 performs selection processing to eliminate individuals having a bad evaluation value by a previously defined number. After that, pairing is performed for the remaining individuals in a random manner, and crossover processing to perform a single point crossover is performed. Then, individuals are selected in a random manner by the number corresponding to a mutation rate portion to the number of the total individuals, and mutation processing to change a gene at an optional genetic locus of each of the selected individuals is performed. In addition, the processings from the evaluation processing to the mutation processing are repeated to thereby obtain finally the most excellent gene, and the finally obtained gene is determined as the optimum proposed plan of fresh water production quantity.

Figure 5:
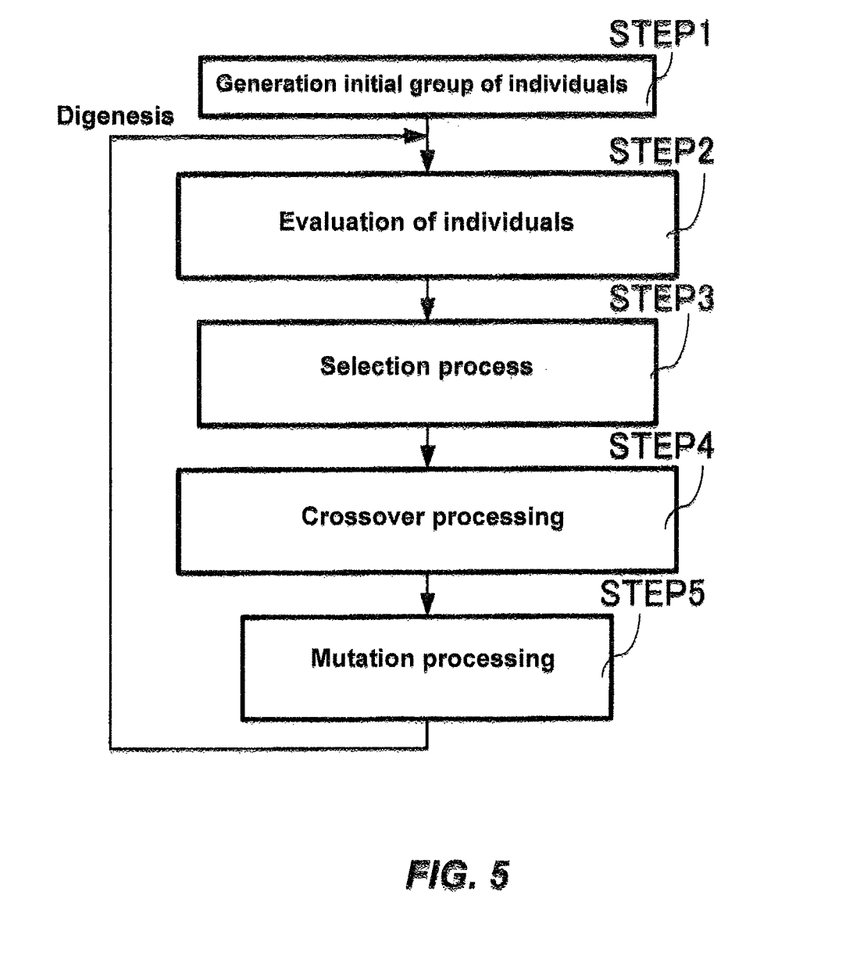
FIG. 5 shows a flow chart to describe a genetic algorithm which is an example of an optimization method in the seawater desalination plant system according to the embodiment.

This genetic algorithm will be described by means of FIG. 5.

<STEP-1> Generation of an Initial Group of Individuals n individuals are generated, each of which has a gene generated by allotting fresh water production quantities for each predetermined time in a random manner. n is a previously defined number.

<STEP-2> Evaluation Processing

An evaluation value of the fresh water production quantity plan of each individual is calculated by the expression (5) and so on. In this case, when an individual does not satisfy the above-described constrained condition, the evaluation value of this individual is made 0.

<STEP-3> Selection Processing

Individuals with bad evaluation values (the evaluation value is small) are eliminated (deleted). The number of individuals to be eliminated is previously defined.

<STEP-4> Crossover Processing

Pairing of the individuals is performed in a random manner. Pairing is performed by the number corresponding to a predetermined ratio (crossover rate) to the number of the total individuals. Genetic loci (places of genes) are selected for each pair in a random manner, and a single point crossover is performed. In the single point crossover, a set of genes before or behind of the selected genetic loci are mutually exchanged. In addition, the crossover processing is performed between ones having the same facility number.

<STEP-5> Mutation Processing

Individuals are selected in a random manner by the number corresponding to a predetermined ratio (a mutation rate) to the number of the total individuals. For the selected individual, a gene is changed at the genetic locus selected in a random manner.

<STEP-6> End Determination Processing (not Shown in FIG.)

The processing of <STEP-2>-<STEP-5> are repeated, and the processing ends when the previously set end condition is satisfied. The end condition means that the number of repetitions reaches a scheduled number of times, for example.

By the above-described means, the optimum plan calculation means 34 determines the optimum fresh water production quantity plan to minimize the electric power consumption rate per day of the seawater desalination plant.

The display means 36 displays the content of the obtained optimum fresh water production quantity plan on the screen. That is, the display means 36 displays the transition of the fresh water production quantity at each time, the reduction effect of the electric power consumption rate and so on on the screen. By this means, an operator can accurately grasp the content of the optimum fresh water production quantity plan from the displayed content, and can also grasp the electric power reduction effect.

In addition, the target value of the fresh water production quantity and the target value of the recovery rate for each predetermined time based on the optimum fresh water production quantity plan which is obtained by the optimum plan calculation means 34 are outputted to the plant unit 10 by the data output means 37 as the control target values. By this means, the plant unit 10 is operated in the state where the power consumption of a day required for seawater desalination is smallest, and can surely obtain the necessary quantity of fresh water. That is, the embodiment can produce fresh water of the quantity required for a day with a minimum cost.

For this reason, according to the present embodiment, it is possible to provide a seawater desalination plant system which is provided with a function to create a fresh water production quantity plan during a definite period so as to produce fresh water of the quantity required for the definite period with a minimum cost (electric power consumption rate), or a function to support the creation of the fresh water production quantity plan.

Second Embodiment

Figure 2:
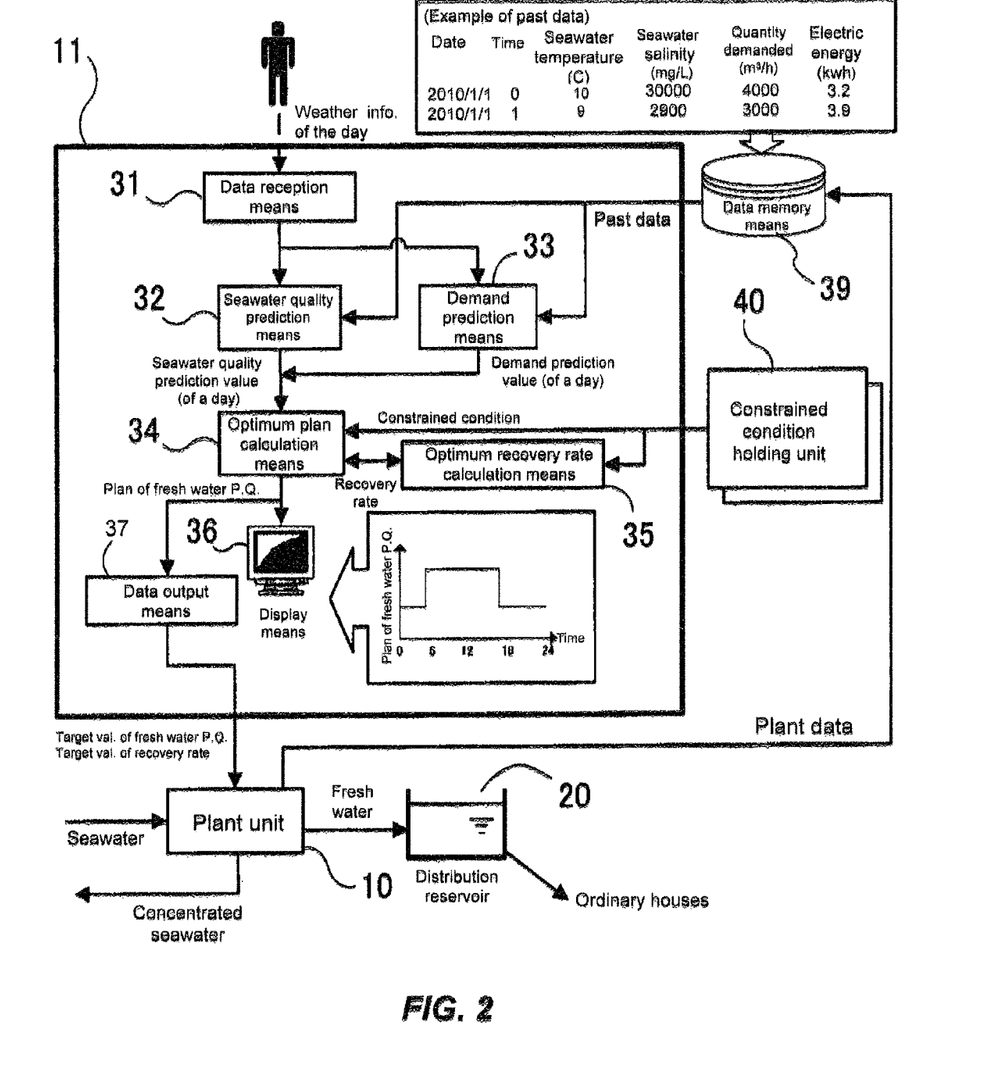
FIG. 2 shows a functional block of a controller unit in the seawater desalination plant system according to the embodiment.
Figure 6:
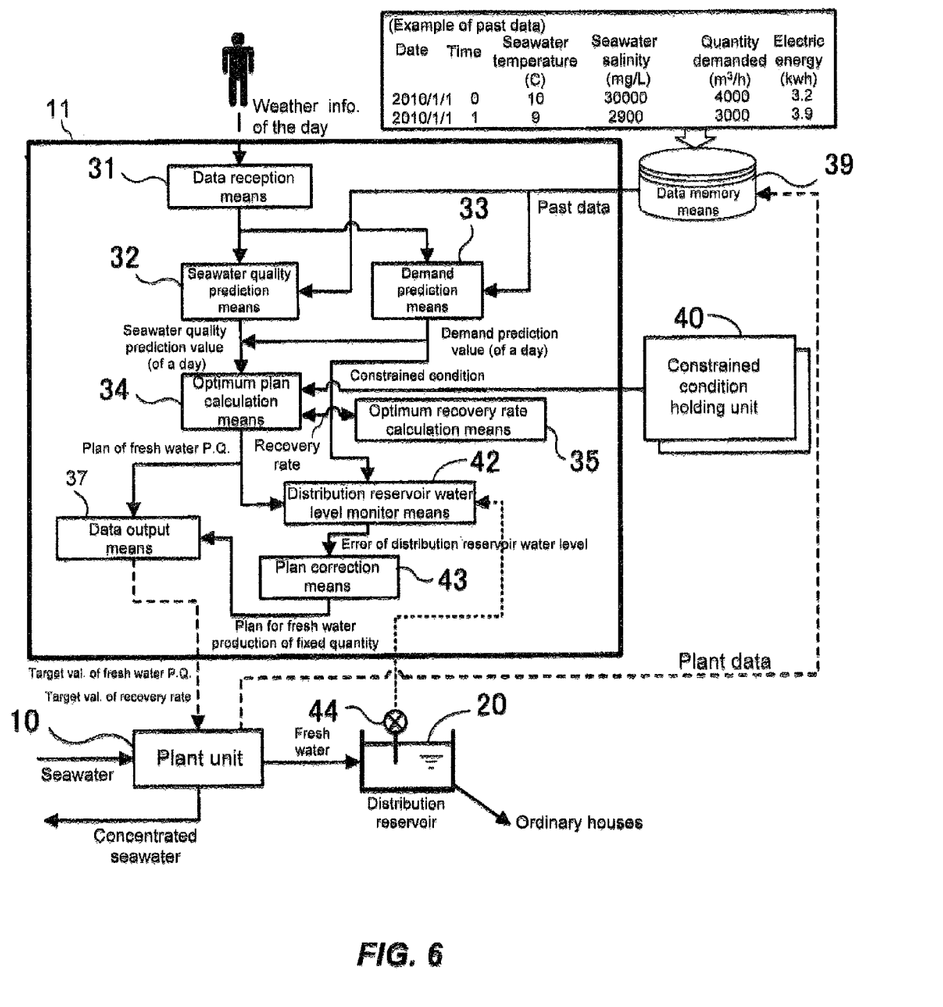
FIG. 6 shows a seawater desalination plant system according to another embodiment.

In the controller unit 11 of a second embodiment shown in FIG. 6, distribution reservoir water level monitor means 42 and plan correction means 43 are added as functions to the controller unit 11 of the embodiment shown in FIG. 2. An actually measured water level of the distribution reservoir 20 measured with water level measurement means 44 is inputted to the distribution reservoir water level monitor means 42.

The distribution reservoir water level monitor means 42 obtains a predicted water level of the distribution reservoir 20 for each predetermined time from the difference between the fresh water production quantity for the each predetermined time based on the optimum fresh water production quantity plan which is obtained by the optimum plan calculation means 34, and the quantity demanded for the each predetermined time which is predicted by the demand prediction means 33. When the difference between the fresh water production quantity and the quantity demanded is divided by the area of the distribution reservoir 20, a water level of the distribution reservoir 20 can be predicted. In addition, the actually measured water level of the distribution reservoir 20 is inputted from the water level measurement means 44 to the distribution reservoir water level monitor means 42. The distribution reservoir water level monitor means 42 obtains a deviation between the actually measured water level and the prediction water level for the each predetermined time, and compares the absolute value of this deviation with a previously set threshold value to thereby monitor whether or not the deviation has exceeded the threshold value.

The plan correction means 43, in a case where the deviation obtained by this distribution reservoir water level monitor means 42 has become not less than the threshold value, judges that an error of the optimum fresh water production quantity plan is large and corrects this fresh water production quantity plan. The quantity of fresh water (not shown) produced in the plant unit 10 is inputted to the plan correction means 43. Accordingly, the plan correction means 43, using the fresh water production quantity actually produced from a starting time of the operation of the optimum fresh water production quantity plan to the time when the deviation becomes not less than the threshold value, calculates fresh water production quantity required for the remaining period of the optimum fresh water production quantity plan. And the plan correction means 43 calculates a fresh water production quantity plan which can produce the fresh water production quantity required for this remaining period, and corrects the optimum fresh water production quantity plan. The fresh water production quantity plan for correction may be calculated with the same method as the method of the above-described optimum plan calculation means 34, or may be calculated assuming that the fresh water production quantity is constant for the each predetermined time when the remaining period is short.

That is, the distribution reservoir water level monitor means 42 derives a water level plan of the distribution reservoir 20 based on the fresh water production quantity plan and the prediction value of the quantity demanded of a day, and monitors an error (the water level error) between the water level plan and the actually measured water level in real time. And, in a case where the absolute value of the water level error becomes not less than the predetermined threshold value, the plan correction means 43 corrects the optimum fresh water production quantity plan. That is, the plan correction means 43 calculates fresh water production quantity required for the remaining period from the fresh water production quantity produced from a starting time of the operation of the plan to the present time, and calculates a fresh water production quantity plan which can produce the fresh water production quantity required for the remaining period. For this reason, even in a case where the water level error is large and the original fresh water production quantity plan is broken, the fresh water production quantity plan can be properly modified by means of the correction.

According to the present embodiment, the fresh water of the quantity required for a day can be produced with a minimum cost in the same manner as the manner of the first embodiment. In addition, according to the present embodiment, as the plan correction means 43 is provided, even in a case where the original fresh water production quantity plan is broken, the fresh water production quantity plan can be properly modified.

Third Embodiment

Figure 7:
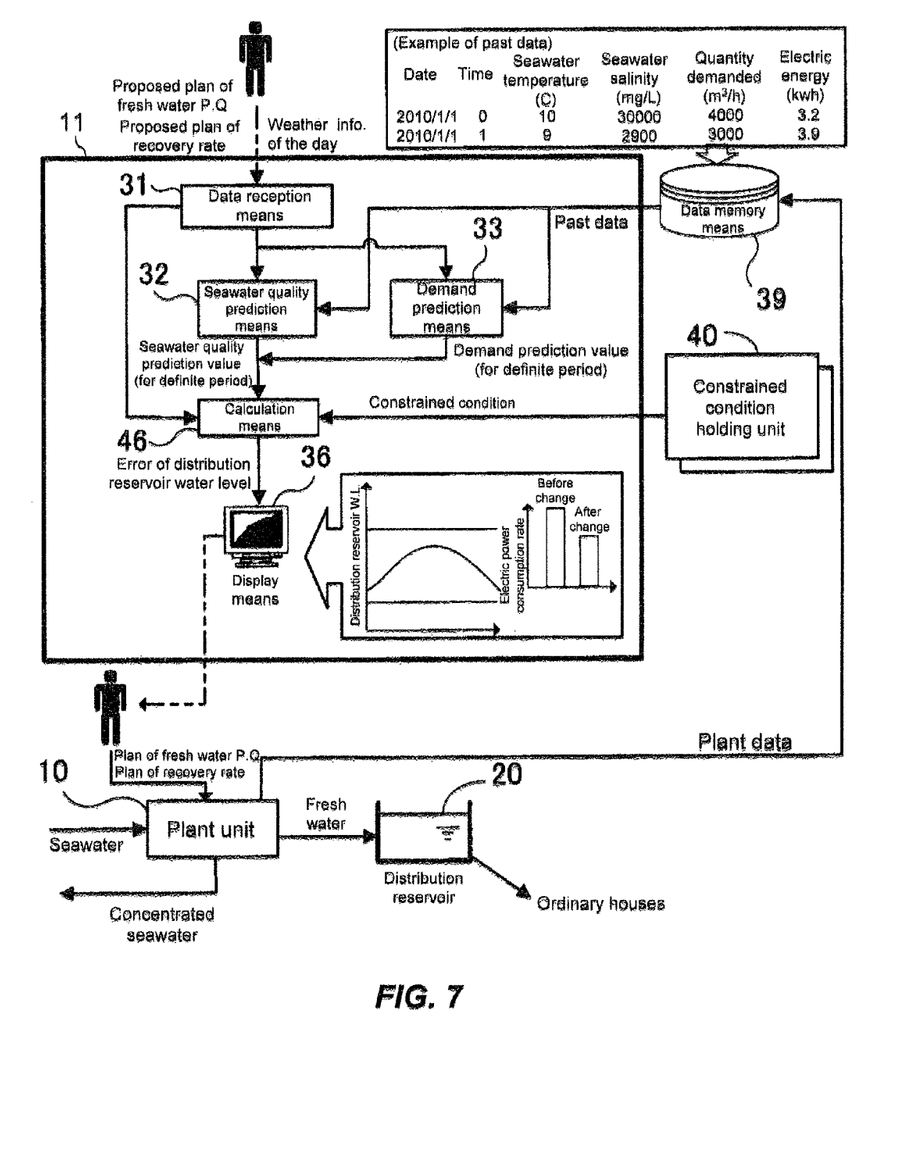
FIG. 7 shows a seawater desalination plant system according to a further other embodiment.

A third embodiment shown in FIG. 7 is not provided with the optimum plan calculation means 34 and the optimum recovery rate calculation means 35 in the first embodiment shown in FIG. 2. In the third embodiment, an operator determines a proposed plan of fresh water production quantity and a recovery rate plan, and inputs a fresh water production quantity plan to the data reception means 31. In this embodiment, the operator previously creates, from the past experimental rule, a plurality of proposed plans of fresh water production quantity in each of which fresh water production quantity required for a day is allotted to each hour. And the operator selects a proposed plan of fresh water production quantity which is assumed to be optimum based on the day of the week and the weather information and so on, and inputs the selected proposed plan of fresh water production quantity to the data reception means 31. The controller unit 11 is provided with calculation means 46 of the water level of the distribution reservoir and the electric power consumption rate as its function, in place of the optimum plan calculation means 34, in order to grasp the quality of the inputted proposed plan of fresh water production quantity.

The calculation means 46 predicts a water level of the distribution reservoir for each predetermined time which is obtained from the difference between the fresh water production quantity for each predetermined time based on the inputted proposed plan of fresh water production quantity and the quantity demanded for the each predetermined time which is predicted in the demand prediction means 33. In addition, the calculation means 46, with respect to the proposed plan of fresh water production quantity, calculates an electric power consumption rate for desalination based on the above-described expression (5) using the seawater quality predicted for the each predetermined time, the fresh water production quantity, and a previously obtained recovery rate.

The display means 36 displays the water level of the distribution reservoir and the electric power consumption rate which are calculated by the calculation means 46. With respect to the water level of the distribution reservoir, for example, the display means 36 displays the upper and lower limits of the water level of the distribution reservoir 20 inputted from the constrained condition holding unit 40 and the predictable hourly change in the water level of the distribution reservoir 20 on the screen as shown in FIG. 7. In addition, with respect to the electric power consumption rate, the display means 36 displays the electric power consumption rate on the screen as shown in FIG. 7. The operator sees the content displayed on the screen to thereby judge right and wrong of the inputted proposed plan of fresh water production quantity, and determines whether or not the fresh water production quantity plan is adopted based on the judgment result. That is, the controller unit 11 has a function to support the creation of the fresh water production quantity plan.

In this embodiment, the display means 36 displays the change in the water level of the distribution reservoir and the improvement effect of the electric power consumption rate on the screen, in a case where the proposed plan of fresh water production quantity for the definite period is performed. By this means, the operator can determine whether or not the inputted proposed plan of fresh water production quantity is adopted. That is, the controller unit 11 supports the creation of the fresh water production quantity plan which the operator performs.

Fourth Embodiment

Figure 8:
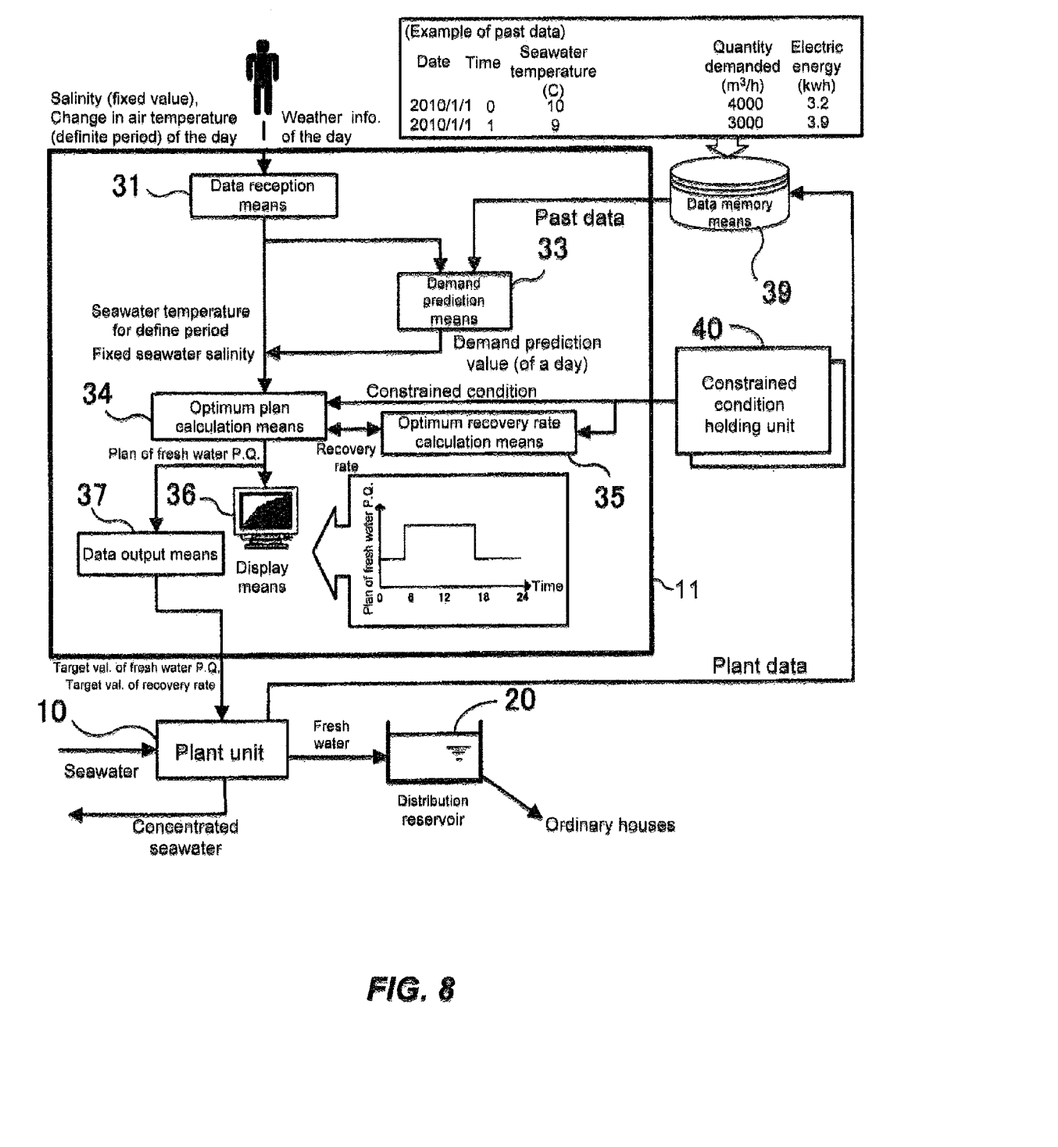
FIG. 8 shows a seawater desalination plant system according to a further different embodiment.

A fourth embodiment shown in FIG. 8 is not provided with the seawater quality prediction means 32 in the first embodiment shown in FIG. 2. Assuming that the seawater salinity is constant, a fixed value is inputted to the data reception means 31. In addition, assuming that the change in seawater temperature is equivalent to the change in air temperature, the change in air temperature during a definite period of the past day of the similar weather is inputted to the data reception means 31. That is, according to the fourth embodiment, even under the condition that it is difficult to predict seawater quality, by assuming that the salinity is a fixed value and assuming the change in air temperature as the change in seawater temperature, the controller unit 11 can create an optimum fresh water production quantity plan and can perform the optimum fresh water production quantity plan.

In addition, the seawater quality prediction means 32 in the second embodiment and the third embodiment may be removed, and the above-described feature of the present embodiment may be applied to the second embodiment and the third embodiment.

Fifth Embodiment

In each of the above-described embodiments, the plant unit 10 has the fresh water production facility of one system to produce fresh water from seawater. In addition the controller unit 11 controls the single fresh water production facility based on the optimum fresh water production quantity plan. However, in a fifth embodiment, the plant unit 10 is provided with the fresh water production facilities 12 of a plurality of lines.

That is, in this embodiment, the plant unit 10 described in FIG. 1 has the fresh water production facilities of a plurality of lines. The fresh water produced in these plural lines of fresh water production facilities is supplied to customers via the single distribution reservoir 20. This embodiment has a controller unit with the same construction as the controller unit 11 shown in FIG. 2. Hereinafter, the controller unit 11 of this embodiment will be described with reference to FIG. 2.

The controller unit 11 of this embodiment has the optimum plan calculation means 34. This optimum plan calculation means 34 creates a plurality of proposed plans of fresh water production quantity for a definite period in which the fresh water production quantity required during the definite period is allotted to each predetermined time. And the optimum plan calculation means 34, with respect to each of a plurality of proposed plans of fresh water production quantity, using the seawater quality and the fresh water production quantity which are predicted for each predetermined time and the previously obtained recovery rate, calculates an electric power consumption rate for desalination, and obtains an optimum fresh water production quantity plan based on the calculated electric power consumption rate. In this embodiment, the control target of the controller unit 11 is the plural lines of the fresh water production facilities 12. The fresh water production quantity plan is a plan for these plural lines of fresh water production facilities 12. When fresh water production quantity at a certain time instant k is defined as Q(k), the value of Q(k) is discretized by the fresh water production quantity per line. That is, the fresh water production quantity of the whole desalination plant system changes in a stepwise manner due to the on-off combination of the plural lines of fresh water production facilities 12. For this reason, the optimum plan calculation means 34 distributes the fresh water production quantity for the each predetermined time (an hour) to the plural lines of fresh water production facilities 12, and thereby creates an optimum fresh water production quantity plan for the definite period (a day).

The fresh water production quantity for the each predetermined time based on the optimum fresh water production quantity plan obtained by the optimum plan calculation means 34 is outputted from the data output means 37 to the plant unit 10 as the on-off control data for the plural lines of fresh water production facilities 12.

In the plant system like this having the large-scale plant unit 10 in which a plurality of lines of the fresh water production facilities 12 to desalinate seawater are provided, the optimum plan calculation means 34 creates the optimum fresh water production quantity plan to thereby operate the plant unit 10. In addition, it can be applied not only to the first embodiment, but also to the second embodiment, the third embodiment and the fourth embodiment that the plant unit 10 is provided with the fresh water production facilities 12 of a plurality of lines.

Modification of Each Embodiment

In a case where the charge of electric power which a seawater desalination plant system uses differs depending on a time of day, when there is a difference between daytime electric power charge and night electric power charge, for example, the optimum plan calculation means 34 derives a proposed plan of fresh water production quantity to minimize a unit price of the electric power charge of an electric power consumption rate which has been calculated in consideration of the charge depending on the time of day. That is, in an area where electric power charge varies depending on a time of day, such as an area where there is a difference between daytime electric power charge and night electric power charge, an object function to minimize the electric power charge per unit fresh water production quantity is used.

In addition, in a case where the quantity of fresh water to be produced or required during a definite period (a day) is determined by an upper organization of the relevant plant system, in order that an operator can evaluate the determined fresh water production quantity, the display means 36 may display an error between the predicted value of the water level and an actually measured water level of the distribution reservoir of the day, and the transition of the electric power consumption rate on the screen.

According to each of the above-described embodiments, it is possible to provide a seawater desalination plant system which is provided with a function to create a fresh water production quantity plan during a definite period so as to produce fresh water production quantity required for the definite period with a minimum cost (electric power consumption rate), or a function to support the creation of the fresh water production quantity plan.

While certain embodiments have been described, those embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A seawater desalination plant system which has a plant unit to produce fresh water from seawater and supplies the produced fresh water to customers through a distribution reservoir, the seawater desalination plant system comprising:
a seawater quality prediction means which predicts quality of the seawater for each predetermined time during a certain definite period based on a past actual measurement value of quality of seawater;
an optimum plan calculation means which creates a plurality of proposed plans of fresh water production quantity during the definite period in which fresh water production quantity required for the definite period is allotted to the each predetermined time, with respect to each of these plurality of proposed plans of fresh water production quantity, calculates an electric power consumption rate for producing fresh water for the each predetermined time, using the seawater quality predicted for the each predetermined time, the fresh water production quantity allotted to the each predetermined time, and a previously obtained recovery rate, and obtains an optimum fresh water production quantity plan from the plurality of proposed plans of fresh water production quantity based on the calculated electric power consumption rate; and
a display means which displays the content of the optimum fresh water production quantity plan obtained by the optimum plan calculation means.

2. The seawater desalination plant system according to claim 1, wherein:
the optimum plan calculation means uses a genetic algorithm which generates a plurality of individuals each having as a gene the proposed plan of fresh water production quantity in which the fresh water production quantities for the each predetermined time are allotted in a random manner, performs evaluation processing to evaluate each of the individuals based on the electric power consumption rate, performs selection processing to eliminate the individuals having a bad evaluation value by a previously defined number, performs pairing the remaining individuals in a random manner and performs crossover processing to perform a single point crossover for each pair, then selects the individuals in a random manner by the number corresponding to a mutation rate portion to the number of total individuals, performs mutation processing which changes a gene at an optional genetic locus of each of the selected individuals, further repeats the processings from the evaluation processing to the mutation processing, and finally obtains the most excellent individual.

3. A seawater desalination plant system which has a plant unit to produce fresh water from seawater and supplies the produced fresh water to customers through a distribution reservoir, the seawater desalination plant system comprising:
- a data reception unit which receives a fixed value as seawater salinity, and receives a change in air temperature of a past similar weather day for each predetermined time during a certain definite period as a change in seawater temperature;
- an optimum plan calculation means which creates a plurality of proposed plans of fresh water production quantity for the definite period in which fresh water production quantity required for the definite period is allotted to the each predetermined time, with respect to each of these plurality of proposed plans of fresh water production quantity, calculates an electric power consumption rate for producing fresh water for the each predetermined time, using the fixed value indicating the seawater salinity, the change in air temperature for the each predetermined time indicating the change in seawater temperature, the fresh water production quantity allotted to the each predetermined time and a previously obtained recovery rate, calculates an electric power consumption rate per the definite period based on this calculated electric power consumption rate, and obtains an optimum fresh water production quantity plan from the plurality of proposed plans of fresh water production quantity; and
- a display means which displays the content of the optimum fresh water production quantity plan obtained by the optimum plan.

4. The seawater desalination plant system according to claim 1 or claim 3, the seawater desalination plant system further comprising:
- a data output means which outputs the fresh water production quantity for the each predetermined time by the optimum fresh water production quantity plan obtained by the optimum plan calculation means as a target value of the fresh water production quantity to the plant unit.

5. The seawater desalination plant system according to claim 4, the seawater desalination plant system further comprising:
- a demand prediction means which predicts quantity demanded of fresh water supplied from the distribution reservoir for the each predetermined time during a certain definite period based on a past actual measurement value;
- a water level measurement means which measures a water level of the distribution reservoir;
- a distribution reservoir water level monitor means which obtains a deviation between a predicted water level of the distribution reservoir for the each predetermined time and the water level measured by the water level measurement means, the predicted water level being obtained from a difference between the fresh water production quantity for the each predetermined time by the optimum fresh water production quantity plan obtained by the optimum plan calculation means, and the quantity demanded for the each predetermined time predicted by the demand prediction means; and
- a plan correction means which, in a case where an absolute value of the deviation obtained by this distribution reservoir water level monitor means becomes not less than a previously set threshold value, calculates fresh water production quantity required for the remaining period of the optimum fresh water production quantity plan from fresh water production quantity from a starting time of the operation of the optimum fresh water production quantity plan to the time when the absolute value of the deviation becomes not less than the threshold value, and calculates a fresh water production quantity plan which can produce the fresh water production quantity required for this remaining period.

6. In the seawater desalination plant system according to claim 1 or claim 3, wherein the plant unit has a plurality of lines of desalination facilities, each of which produces fresh water from seawater and supplies the fresh water produced to the distribution reservoir, the seawater desalination plant system further comprising:
- a data output means which outputs the fresh water production quantity for the each predetermined time by the optimum fresh water production quantity plan obtained by the optimum plan calculation means to the plant unit as on/off control data for the plurality of lines of desalination facilities.

7. The seawater desalination plant system according to claim 1 or claim 3, wherein the optimum plan calculation means selects a proposed plan of fresh water production quantity in which an electric power consumption rate is minimum per the definite period, as the optimum fresh water production quantity plan.

8. The seawater desalination plant system according to claim 1 or claim 3, wherein in a case where an electric power charge changes depending on a time of day, the optimum plan calculation means selects a propose plan of fresh water production quantity in which a unit electric power charge of the electric power consumption rate which is calculated in consideration of the electric power charge depending on the time of day is minimum, as the optimum fresh water production quantity plan.

9. A seawater desalination plant system which has a plant unit to produce fresh water from seawater and supplies the produced fresh water to customers through a distribution reservoir, the seawater desalination plant system comprising:
- a seawater quality prediction means which predicts quality of the seawater for each predetermined time during a certain definite period based on a past actual measurement value of quality of seawater;
- a demand prediction means which predicts quantity demanded of fresh water supplied from the distribution reservoir for the each predetermined time during the certain definite period based on a past actual measurement value of the quantity demanded;
- a calculation means which creates previously a fresh water production quantity plan during the definite period in which the fresh water production quantity required for the definite period is allotted to the each predetermined time, predicts a prediction water level of the distribution reservoir for the each predetermined time obtained from the difference between the fresh water production quantity for the each predetermined time by the created proposed plan of fresh water production quantity and the quantity demanded for the each predetermined time predicted by the demand prediction means, and calculate, with respect to the proposed plan of fresh water production quantity, an electric power consumption rate for producing fresh water using the seawater quality predicted for the each predetermined time, the fresh water production quantity and a previously obtained recovery rate; and
- a display means which displays the predicted water level of the distribution reservoir and the electric power consumption rate obtained by this calculation means.

10. The seawater desalination plant system according to claim 1 or claim 3, the seawater desalination plant system further comprising:

a demand prediction means which predicts quantity demanded of fresh water during the definite period, and obtains fresh water production quantity required for the definite period.

11. The seawater desalination plant system according to claim 10, wherein the demand prediction means predicts the quantity demanded of fresh water during the definite period from a past actual measurement value of the quantity demanded of fresh water based on weather information and a day of the week.

12. The seawater desalination plant system according to claim 5, the seawater desalination plant system further comprising display means:

wherein, in a case where the fresh water production quantity required for the definite period is determined by an upper organization of the seawater desalination plant system, the display means displays an error between the predicted water level and an actually measured water level of the distribution reservoir and transition of the electric power consumption rate on a screen.

* * * * *